US010270945B2

(12) United States Patent
Wang et al.

(10) Patent No.: US 10,270,945 B2
(45) Date of Patent: Apr. 23, 2019

(54) INTERACTIVE SYNCHRONIZATION OF MULTIPLE VIDEOS

(71) Applicant: Disney Enterprises, Inc., Burbank, CA (US)

(72) Inventors: Oliver Wang, Zürich (CH); Christopher Schroers, Saarbrücken (DE); Henning Zimmer, Zurich (CH); Alexander Sorkine Hornung, Zurich (CH); Markus Gross, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/308,952

(22) Filed: Jun. 19, 2014

(65) Prior Publication Data
US 2015/0332096 A1 Nov. 19, 2015

Related U.S. Application Data

(60) Provisional application No. 61/994,617, filed on May 16, 2014.

(51) Int. Cl.
H04N 17/00 (2006.01)
H04N 5/04 (2006.01)
G06K 9/00 (2006.01)
G06K 9/62 (2006.01)
G06K 9/46 (2006.01)
G06K 9/68 (2006.01)

(52) U.S. Cl.
CPC ........... H04N 5/04 (2013.01); G06K 9/00744 (2013.01); G06K 9/00758 (2013.01); G06K 9/46 (2013.01); G06K 9/4609 (2013.01); G06K 9/4642 (2013.01); G06K 9/6201 (2013.01); G06K 9/6892 (2013.01)

(58) Field of Classification Search
CPC .................................. H04N 17/00; H04N 5/04
USPC ......................................................... 348/184
See application file for complete search history.

(56) References Cited

U.S. PATENT DOCUMENTS 9,225,879 B2 * 12/2015 Kappeler ............... H04N 5/144
2008/0266142 A1 * 10/2008 Sula ................... G01C 21/3647
340/995.17

OTHER PUBLICATIONS

Aseem Agarwala, "Panoramic Video Textures", 2005, pp. 1-8.
Simon Baker, "A Database and Evaluation Methodology for Optical Flow" Dec. 2009, pp. 1-50.

(Continued)

Primary Examiner — Jefferey F Harold
Assistant Examiner — Sihar A Karwan
(74) Attorney, Agent, or Firm — Farjami & Farjami LLP

(57) ABSTRACT

There are provided systems and methods for an interactive synchronization of multiple videos. An example system includes a memory storing a first video and a second video, the first video including first video clips and the second video including second video clips. The system further includes a processor configured to calculate a histogram based on a number of features that are similar between the first video clips and the second video clips, generate a cost matrix based on the histogram, generate a first graph that includes first nodes based on the cost matrix, compute a path through the graph using the nodes, and align the first video with the second video using the path, where the path corresponds to playback speeds for the first video and the second video.

18 Claims, 5 Drawing Sheets

(56) References Cited

OTHER PUBLICATIONS

Simon Baker, "Lucas-Kanade 20 Years On: A Unifying Framework", Feb. 7, 2003, pp. 1-35.
Victoria Bloom, "G3D: A Gaming Action Dataset and Real Time Action Recognition Evaluation Framework", CVPRW, 20012, pp. 1-6.
Nicholas J. Bryan, "Clustering and Synchronizing Multi-Camera Video Via Landmark Cross-Correlation", CASSP, 2012, pp. 1-4.
Yaron Caspi, "Spatio-Temporal Alignment of Sequences", Nov. 2004, pp. 1409-1424 (16).
Feng Zhou, "Generalized TimeWarping for Multi-modal Alignment of Human Motion", CVPR, 2012, pp. 1-8.
Ferran Diego, "Video Alignment for Change Detection", Jul. 2011, pp. 1858-1869 (12).
Ferran Diego, "Joint Spatio—Temporal Alignment of Sequences", 2013, pp. 1-12.
Georgios D. Evangelidis, "Efficient Subframe Video Alignment Using Short Descriptors", Oct. 2013, pp. 2371-2386 (16).
Kaan Yucer, "Transfusive Image Manipulation", Apr. 11, 2013, pp. 1-9.
Sing Bing Kang, "High Dynamic Range Video", 2003, pp. 319-325 (7).
Ruonan Li and Rama Challappa, "Aligning Spatio-Temporal Signals on a Special Manifold", 2010, pp. 1-14.
Ce Liu, "SIFT Flow: Dense Correspondence across Scenes and Its Applications", May 2011, pp. 978-994 (17).
Chong-Wah Ngo, "Video Summarization and Scene Detection by Graph Modeling", Feb. 2005, pp. 296-305 (10).
Flavio L. C. Padua, "Linear Sequence-to-Sequence Alignment", 2010, pp. 1-33.
Cen Rao, "View-invariant Alignment and Matching of Video Sequences", 2003, pp. 1-7.
Jan Ruegg, DuctTake: Spatiotemporal Video Compositing, vol. 32, 2013, pp. 1-11.
Peter Sand and Seth Teller, "Video Matching", 2014, pp. 1-8.
Daniel Sharstein, "A Taxonomy and Evaluation of Dense Two-Frame Stereo Correspondence Algorithms", 2002, pp. 1-36.
Prarthana Shrestha, "Synchronization of Multiple Camera Videos Using Audio-Visual Features", Jan. 2010, pp. 79-92 (14).
Brian Summa, "Panorama Weaving: Fast and Flexible Seam Processing", 2012, pp. 1-11.
Yaron Ukrainitz and Michal Irani, "Aligning Sequences and Actions by Maximizing Space-Time Correlations" 2006, pp. 538-550 (13).
Yu-Gang Jiang, "Towards Optimal Bag-of-Features for Object Categorization and Semantic Video Retrieval", 2007, pp. 1-8.
Henning Zimmer, "Optic Flow in Harmony", 2011, pp. 368-388 (21).

\* cited by examiner

INTERACTIVE SYNCHRONIZATION OF MULTIPLE VIDEOS

RELATED APPLICATION(S)

The present application claims the benefit of and priority to a U.S. Provisional Patent Application Ser. No. 61/994,617, filed May 16, 2014, and titled "VideoSnapping: Interactive Synchronization of Multiple Videos," which is hereby incorporated by reference in its entirety into the present application.

BACKGROUND

Aligning videos is a crucial task in computer graphics and vision, required for a wide range of applications. However, when aligning video frames, many problems may arise. For example, if a user tries to align videos taken from different camera trajectories and/or at different times, the scene content and appearance may vary greatly due to the change in perspective, the moving scene content, and lighting differences, and cause the video frames that are aligned to have arbitrarily different appearances.

SUMMARY

The present disclosure is directed to an interactive synchronization of multiple video clips, substantially as shown in and/or described in connection with at least one of the figures, as set forth more completely in the claims.

DETAILED DESCRIPTION

Figure 1:
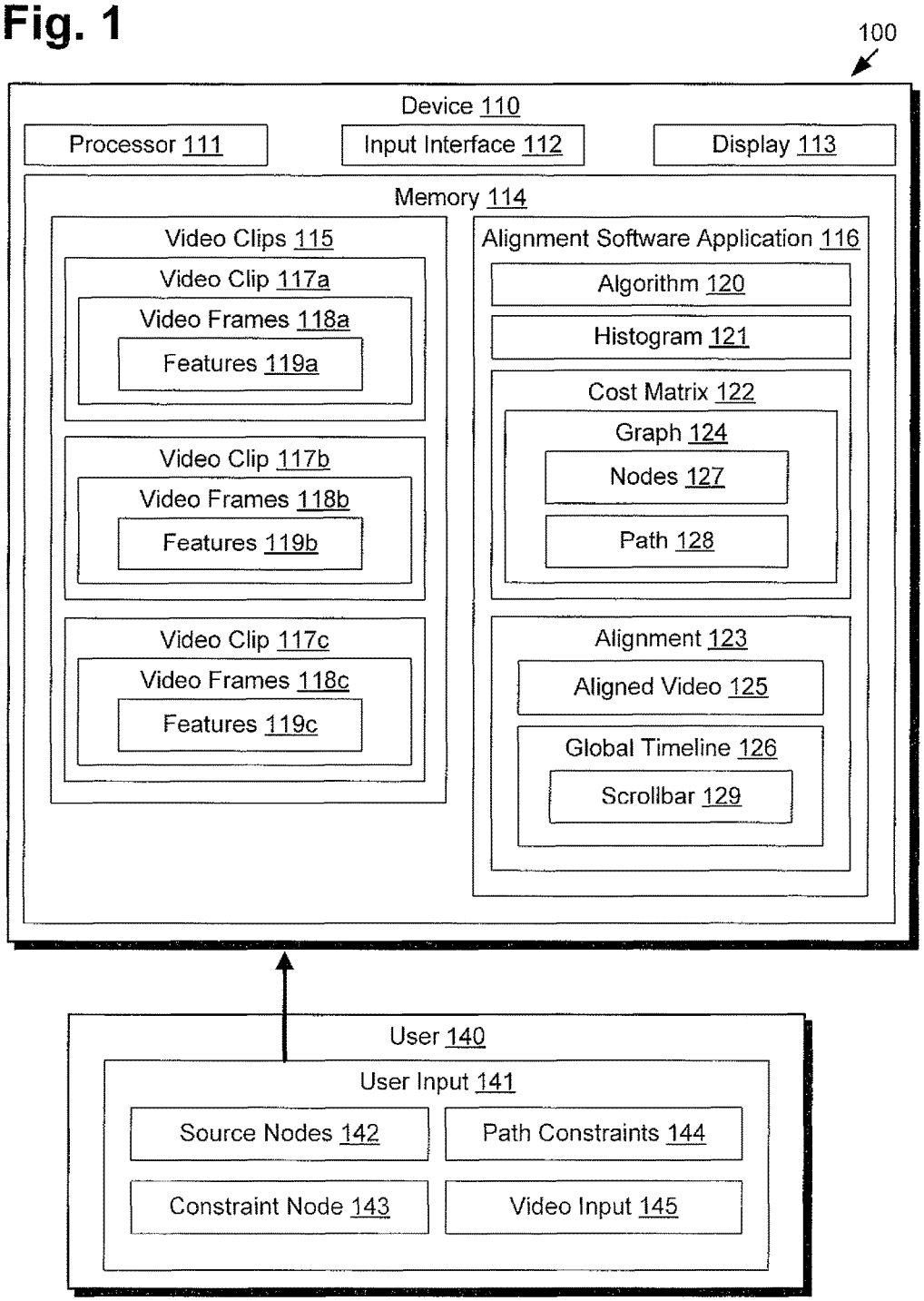
FIG. 1 presents a system for an interactive synchronization of multiple video clips, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for an interactive synchronization of multiple video clips, according to one implementation of the present disclosure. System 100 of FIG. 1 includes device 110 and user 140. Device 110 includes processor 111, input interface 112, display 113, and memory 114. Memory 114 includes video clips 115 and alignment software application 116. Video clips 115 includes video clip 117a, video clip 117b, and video clip 117c, collectively referred to as video clips 117, which respectively include video frames 118a, video frames 118b, and video frames 118c, collectively referred to as video frames 118, which respectively include features 119a, features 119b, and features 119c, collectively referred to as features 119. Alignment software application 116 includes algorithm 120, histogram 121, cost matrix 122, and alignment 123. Cost matrix 122 includes graph 124, which includes nodes 127 and path 128. Alignment 123 includes aligned video 125 and global timeline 126, which includes scrollbar 129. User 140 includes user inputs 141, which includes source nodes 142, constraint node 143, path constraints 144, and video input 145.

Device 110 may comprise a personal computer, a mobile phone, a tablet, a video game console, or any other device capable of executing alignment software application 116 to interactively synchronize video clips 115. As shown in FIG. 1, device 110 includes input interface 112 and display 113. Input interface 112 may comprise, for example, a keyboard, a mouse, a game controller, a touch-screen input, a thermal and/or electrical sensor, or any other device capable of accepting user input for use with device 110. Display 113 may comprise a liquid crystal display (LCD) screen built into device 110. In alternative implementations of the present disclosure, display 113 may be another type of display hardware, such as cathode-ray tubes (CRT) monitors. In yet other implementations, display 113 may also be touch sensitive and may serve as input interface 112. Moreover, input interface 112 and display 113 may be externally attached to device 110 through physical or wireless connection.

Device 110 further includes processor 111 and memory 114. Processor 111 may be configured to access memory 114 to store received input or to execute commands, processes, or programs stored in memory 114, such as alignment software application 116. Processor 111 may correspond to a processing device, such as a microprocessor or similar hardware processing device, or a plurality of hardware devices. However, in other implementations processor 111 refers to a general processor capable of performing the functions required of device 110. Memory 114 is capable of storing commands, processes, and programs for execution by processor 111. Memory 114 may be instituted as ROM, RAM, flash memory, or any sufficient memory capable of storing a set of commands. In other implementations, memory 114 may correspond to a plurality memory types or modules.

As illustrated in FIG. 1, memory 114 of device 110 includes video clips 115. Video clips 115 may include videos that are recorded and stored on device 110. For example, video clips 115 may include a video of a sports match, a concert, or a public location. In one implementation, video clips 115 may have been recorded using device 110. For example, device 110 may include a peripheral device (not shown), such as a video camera, that recorded video clips 115. In another implementation, video clips 115 may have been downloaded and stored on device 110 from one or more outside sources (not shown), such as other devices.

Video clips 115 includes three separate video clips, video clip 117a, video clip 117b, and video clip 117c. Each of video clips 117 may include a video recorded at a common place or event, such as at a sporting event, however, video clips 117 may have been recorded at different times or using different trajectories. For example, in one implementation, video clips 117 may include recorded videos of a sporting event where video clip 117a was recorded on the field, video clip 117b was recorded a few rows above the field, and video clip 117c was recorded a little to the left of video clip 117a. For another example, in another implementation, video clips 117 may include videos of a common location, such as a park, but with each recorded at a different time of the day or year.

Each of video clips 117 includes video frames 118, which include features 119. Video frames 118 include all of the frames that make up video clips 117. For example, if video clip 117a was shot for one minute at a rate of ten frames per second, video frames 118a would include all six hundred video frames from video clip 117a. Features 119 include all the features that were recorded in video clips 117. For example, features 119 may include, but are not limited to, people, animals, plants, building, cars, signs, or any other living or non living objects within video clips 117.

It should be noted that the implementation of FIG. 1 only illustrates three video clips 117 stored in memory 114 of device 110, however, the present disclosure is not limited to the implementation of FIG. 1. In other implementations, device 110 may be storing any number of video clips 115 in memory 114. For example, device 110 may only be storing two video clips in memory 114, or device 110 may be storing ten video clips in memory 114.

Also illustrated in FIG. 1, device 110 includes alignment software application 116. Alignment software application 116 is utilized by device 110 to interactively synchronize video clips together, such as two or more of video clips 115. When synchronizing video clips together, alignment software application 116 may utilize partial alignment so that a first video clip does not have to be contained entirely in a second video clip. For example, alignment software application 117 may only align the end of video clip 117a with the beginning of video clip 117b. Furthermore, when synchronizing video clips, alignment software application 116 may further utilize nonlinear temporal video alignments to control playback speeds for each of the aligned video clips. Finally, when synchronizing video clips together, alignment software application 116 may utilize user constraints, as will be explained in greater detail below.

In order to interactively synchronize video clips, alignment software application 116 first generates histogram 121. Histogram 121 is used by alignment software application 116 to estimate the alignment quality for all pairs of video frames between two video clips, where two video frames are more likely to be alignable if they contain a large number of similar features. For example, if alignment software application 116 is trying to synchronize video clip 117a with video clip 117b, alignment software application 116 would compute histogram 121 to estimate the alignment quality for all pairs of video frames between video frames 118a and video frames 118b. In such an example, video frames between video frames 118a and video frames 118b are more likely to be alignable if they contain a large number of similar features, such as features 119a from video frames 118a being similar to features 119b from video frames 118b.

To compute histogram 121, alignment software application 116 first considers all the features found in all of the video frames of the video clips. Each feature in the video clips includes an image space coordinate, a frame number, and a descriptor, where the descriptor may include scale-invariant feature transform (SIFT) feature descriptors. Alignment software application 116 then builds a set of matches by finding the nearest neighbor of each feature from the first video clip in the set of features from the second video clip, based on a distance of the feature's descriptors and image space distance. Each feature match contributes to one bin of histogram 121 based on the video frames that the feature came from.

Alignment software application 116 includes cost matrix 122. After computing histogram 121, alignment software application 116 transforms histogram 121 into cost matrix 122. Cost matrix 121 is used by alignment software application 116 to approximate a cost for aligning pairs of video frames from video clips, where each entry in cost matrix 121 specifies the cost of aligning a pair of video frames. For example, and using the example above where alignment software application 116 is trying to synchronize video clip 117a with video clip 117b, cost matrix 121 would include entries that specify a cost for aligning pairs of video frames between video frames 118a and video frames 118b.

Cost matrix 122 includes graph 124. Graph 124 may include a graphical interpretation of cost matrix 122 that is used to map out a best solution for synchronizing video clips. As such, graph 124 includes nodes 127, where each of nodes 127 is identified by its position in cost matrix 122 and an edge is an ordered pair of nodes 127. Alignment software application 116 uses nodes 127 of graph 124 and algorithm 120 to compute different linear and nonlinear paths through cost matrix 122, where each path temporally maps out a set of corresponding video frames in the video clips with implicit temporal continuity. Algorithm 120 computes the paths by computing a cost for the different paths through graph 124 using nodes 127, where the cost is the average of all the entries in cost matrix 122 that the path crosses. Alignment software application 116 then chooses the path with the lowest cost as path 128. As such, algorithm 120 may compute path 128 using, but is not limited to, Dijkstra's algorithm.

User 140 includes user input 141. User 140 may utilize user input 141 to interactively modify the synchronization of video clips. As such, user input 141 includes source nodes 142, constraint node 143, and path constraints 144, which are used to modify graph 124 for determining path 128 through cost matrix 122. Furthermore, user input 141 includes video input 145, which user 140 uses to scroll through global timeline 126 using scrollbar 129. Scrolling through global timeline 126 with scrollbar 129 can be used to both change a location of constraint node 143 on graph 124, which is described below, and is used to when viewing aligned video 125, which is described in detail with regards to FIG. 4.

Figure 2:
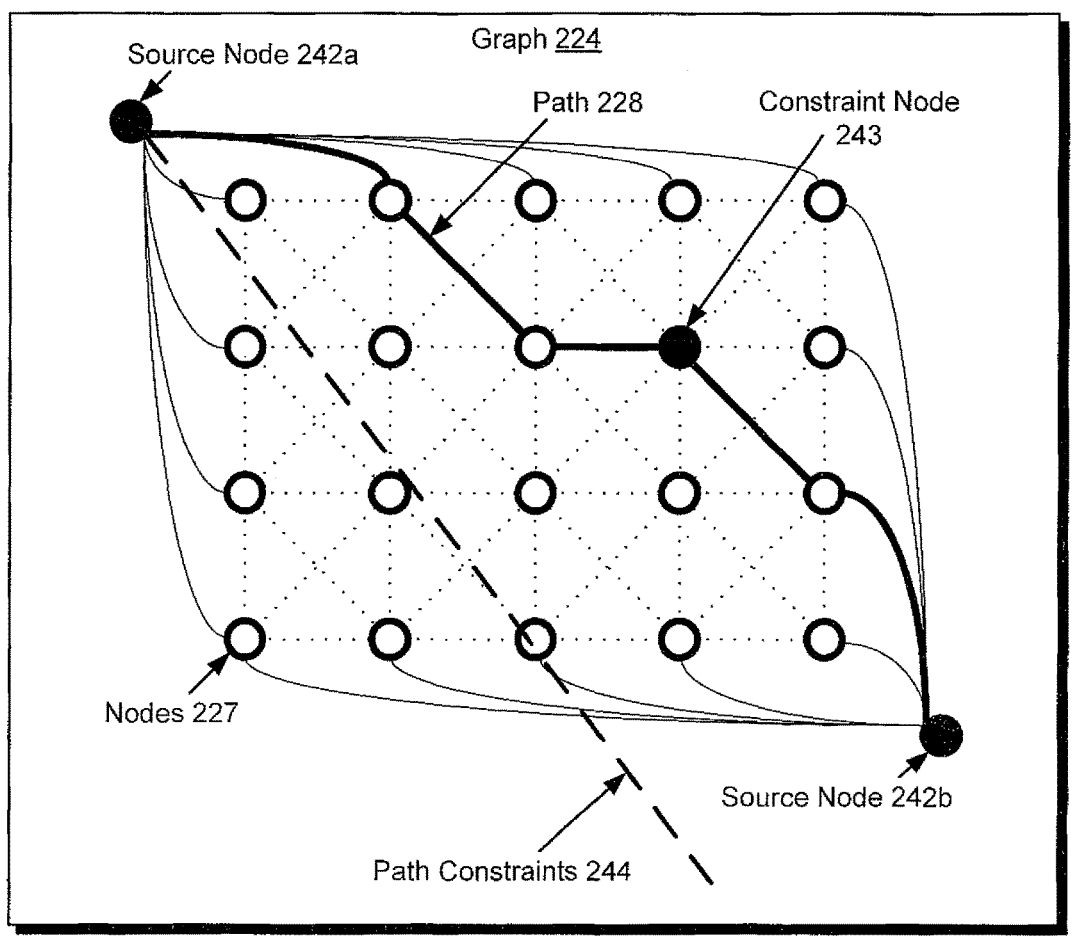
FIG. 2 presents an example of determining a path on a graph using nodes, according to one implementation of the present disclosure.

User 140 may modify the synchronization of video clips by inputting source nodes 142 into graph 124. As discussed above, alignment software application 116 uses partial alignment when aligning video clips, which implies that path 128 can start at any video frame in either video clip, and end at any video frame in either video clip. For example, if alignment software application 116 is aligning video clip 117a with video clip 117b, path 128 for the alignment of video clip 117a and video clip 117b can start at any one of and end at any one of video frames 118a and video frames 118b from video clip 117a and video clip 117b, respectively. User 140 can thus input one of source nodes 142 to connect to the set of start nodes (corresponding to the first frames of the video clips) of graph 124 and input one of source nodes 142 to connect to the set of end nodes (corresponding to the end frames of the video clips) of graph 124. Alignment software application 116 will then utilize source nodes 142 when computing path 128 through graph 124, as illustrated in FIG. 2.

User 140 may also modify the synchronization of video clips by inputting at least one constraint node 143 into graph 124. Constraint node 143 is used by user 140 to specify that a pair of video frames between video clips are in correspondence and thus, path 128 must pass through constraint node 143. For example, if alignment software application 116 is aligning video clip 117a with video clip 117b, alignment software application 116 generates graph 124 for aligning video clip 117a with video clip 117b. User 140 may then input constraint node 143 into nodes 127 of graph 124, where constraint nodes 143 specifies that one of video frames 118a corresponds to one of video frames 118b. Alignment software application 116 then uses constraint node 143 when computing path 128 through graph 124 by making sure path 128 crosses through constraint node 143, as illustrated in FIG. 2.

It should be noted that when inputting constraint node 143 on graph 124, user 140 may utilize video input 145 to advance scrollbar 129 of global timeline 126 to further change the location of constraint node 143 on graph 124 to a new location. For example, if constraint node 143 specifies that one of video frames 118a corresponds to one of video frames 118b, user 140 may utilize video input 145 to advance scrollbar 129 through global timeline 126 to move a location of constraint node 143 on graph 124. In such an example, the new location of constraint node 143 will specify that a second of video frames 118a corresponds to a second of video frames 118b. Alignment software application 116 will then use the new location of constraint node 143 on graph 124 to compute a second path 128 through graph 124 by making sure the second path 128 crosses through the new location of constraint node 143.

Furthermore, user 140 may also modify the synchronization of video clips by inputting path constraints 144 for graph 124. Path constraints 144 may be used by alignment software application 116 to specify a minimum and maximum slope allowed for path 128, as will be illustrated more with regard to FIG. 2. For example, if alignment software application 116 is aligning video clip 117a with video clip 117b, alignment software application 116 generates graph 124 for aligning video clip 117a with video clip 117b. In such an example, user 140 would input path constraints 144 that specify a minimum and maximum slope allowed for path 128 through graph 124.

It should be noted that when synchronizing video clips, alignment software application 116 further uses a global time frame for the video clips. For example, and as discussed above, path 128 uniquely determines a set of video frames that are in correspondence between the video clips. However, path 128 may not define the rate to walk along path when each video clip is played. As such, alignment software application 116 may utilize path parameterization. For example, in a first implementation, alignment software application 116 may use arc-length parameterization, which distributes the temporal warping in both video clips. For another example, in a second implementation, alignment software application 116 may use one of the video clips as a reference video clip for parameterization, which results in a constant playback speed of the reference video clip so that all of the distortion is in the other video clip.

For example, in the first implementation, if video clip 117a was recorded at ten frames per second and video clip 117b was recorded at thirty frames per second, alignment software application 116 may playback video clip 117a synchronized with video clip 117b using arc-length parameterization, thus, playing back both video clip 117a and video clip 117b at twenty frames per second. However, in the second implementation, alignment software application 116 may playback video clip 117a synchronized with video clip 117b using one of video clip 117a or video clip 117b as a reference video clip for the parameterization. In such an implementation, alignment software application 116 may playback both video clip 117a and video clip 117b at ten frames per second if video clip 117a is used as the reference video clip for parameterization, or playback both video clip 117a and video clip 117b at thirty frames per second if video clip 117b is used as the reference video clip for parameterization.

As illustrated in FIG. 1, alignment software application 116 includes alignment 123, which includes aligned video 125 and global timeline 126. After computing path 128, alignment software application 116 is able to playback the synchronized video clips as aligned video 125 using path 128. Furthermore, and as discussed above, alignment software application 116 may further use path parameterization when playing back the synchronized video clips. Also, alignment software application 116 includes global timeline 126 with aligned video 125 so that a user to scroll through aligned video 125 using scrollbar 129, as will be explained in greater detail with regards to FIG. 4.

It should be noted that alignment software application 116 may be utilized to synchronize more than two video clips. When synchronizing three or more video clips together, alignment software application 116 will first calculate histogram 121, generate cost matrix 122, generate graph 124, and determine path 128 through graph 124 for each pair of video clips to determine a cost of aligning each pair of video clips. For example, if alignment software application 116 is synchronizing video clip 117a, video clip 117b, and video clip 117c together, alignment software application 116 will compute cost matrix 122 and determine path 128 for synchronizing video clip 117 with video clip 117b, video clip 117a with video clip 117c, and video clip 117b with video clip 117c to determine the cost of aligning each pair of video clips 117.

Figure 3:
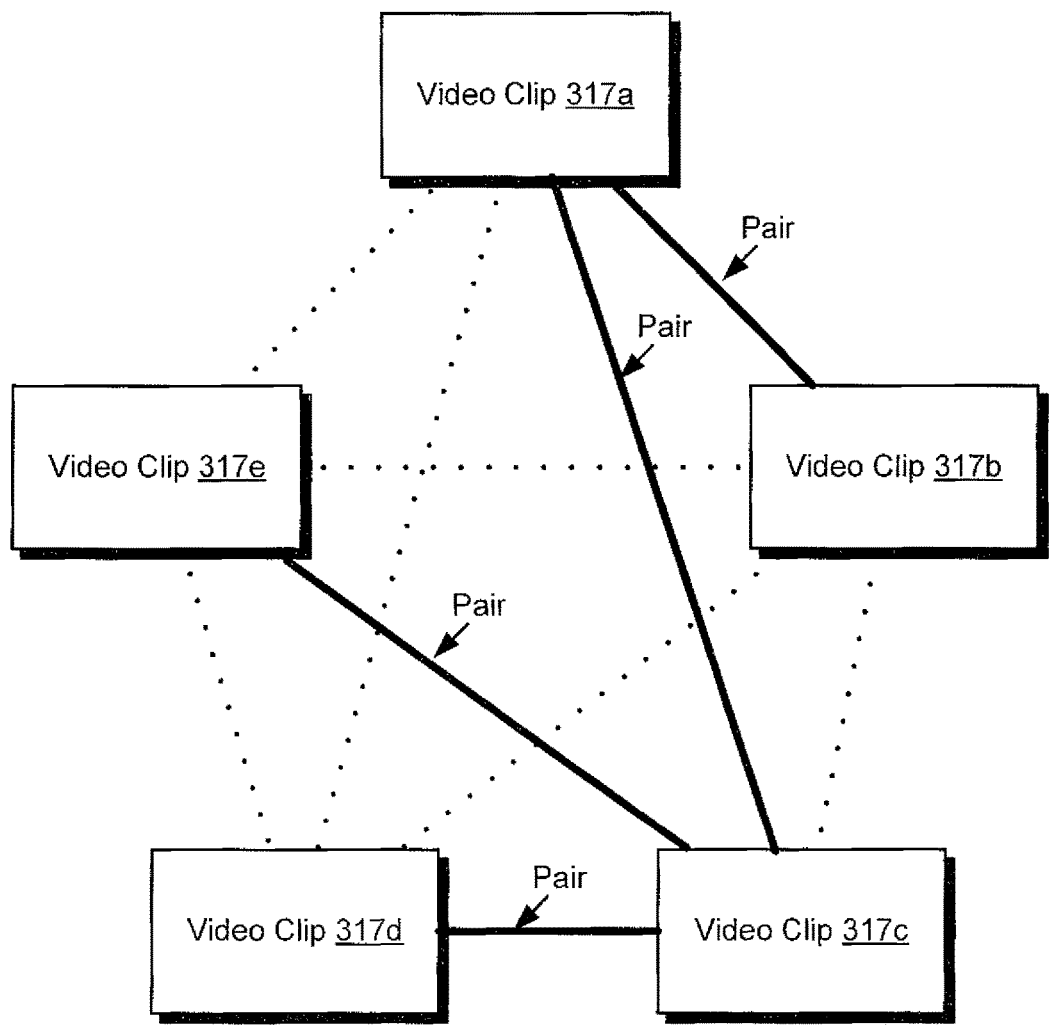
FIG. 3 presents an example of determining optimal alignment pairs for multiple video clips, according to one implementation of the present disclosure.

After determining the cost of aligning each pair of video clips, alignment software application 116 then uses the costs to determine the optimal set of pairwise matches such that every video clip is aligned to at least one other video clip, which is explained in greater detail with regard to FIG. 3. For example, and using the example above where alignment software application 116 is synchronizing video clip 117a, video clip 117b, and video clip 117c together, alignment software application 116 will use the cost of aligning each pair of video clips 117 together to determine the optimal set of pairwise matches for video clips 117. In such an example, alignment software application 116 may determine that the optimal set of pairwise matches is to align video clip 117a with video clip 117b, and align video clip 117a with video clip 117c.

FIG. 2 presents an example of determining a path on a graph using nodes, according to one implementation of the present disclosure. FIG. 2 includes graph 224, nodes 227, path 228, source node 242a and source node 242b, collectively referred to as source nodes 242, constraint node 243, and path constraints 244. With regard to FIG. 2, it should be noted that graph 224, nodes 227, path 228, source nodes 242, constraint node 243, and path constraints 244 correspond respectively to graph 124, nodes 127, path 128, source nodes 142, constraint node 143, and path constraints 144 of FIG. 1.

As illustrated in FIG. 2, graph 224 includes a number of nodes 227, where graph 224 is used to map out the best possible solution for synchronizing video clips together. Each of nodes 227 is connected to other ones of nodes 227 using edges (represented by dotted lines). Furthermore, graph 224 includes a number of user constraints including source nodes 242, constraint node 243, and path constraints 244. An alignment software application, such as alignment software application 116 from FIG. 1, would utilize nodes 227, source nodes 242, constraint node 243, and path constraints 244 when determining the best path through graph 224, such as path 228. By interpreting the cost matrix as a directed graph, paths can also be thought of as a set of connected edges. A node is identified by its position (j, k) in the cost matrix interpreted by graph 224 and an edge is identified as an ordered pair of nodes. In the simplest case where backwards motion is not allowed. each node is connected to its three neighbors, i.e. has the edges ((j, k), (j +1, k)), ((j, k), (j, k +1)) and ((j, k), (j +1, k +1)). The weight of each edge is the value of the cost matrix at the node that the edge points to.

For example, the alignment software application would begin path 228 at source node 242a and end path 228 at source node 242b, where source node 242a is connected to each of the first video frames of the video clips (represented by the top row and left column of nodes 227) and source node 242b is connected to each of the last video frames of the video clips (represented by the bottom row and right column of nodes 227). The alignment software application would further compute path 228 so that path 228 crossed over constraint node 243, which represents that a pair of video frames between the video clips are in correspondence, as selected by a user. Finally, the alignment software application will make sure that path 228 does not does not pass under path constraints 244, which represents the maximum slope allowed for path 228. However, it should be noted that graph 224 may further include a minimum slope allowed for path 228, although not illustrated in FIG. 2.

FIG. 3 presents an example of determining optimal alignment pairs for multiple video clips, according to one implementation of the present disclosure. FIG. 3 includes video clip 317a, video clip 317b, video clip 317c, video clip 317d, and video clip 317e, collectively referred to as video clips 317. FIG. 3 further includes edges (represented as dotted lines) linking video clips 317 and four separate pairs matching video clips 317. With regard to FIG. 3, it should be noted that video clip 317a, video clip 317b, and video clip 317c correspond respectively to video clip 117a, video clip 117b, and video clip 117 from FIG. 1. Furthermore, video clip 117d and video clip 117e were added to FIG. 3 to better illustrate the method of finding optimal alignment pairs between video clips.

As illustrated in FIG. 3, a user may have used an alignment software application to synchronize video clips 317 together. As discussed above, when synchronizing three or more video clips together, the alignment software application first determines a cost of aligning each pair of video clips. For example, the alignment software application would determine a cost of aligning each pair of video clips 317, where the pairs of video clips 317 are represented by the edges connecting video clips 317. The alignment software application then uses the costs of aligning each pair of video clips 317 to determine the optimal set of pairwise matches such that every video clip from video clips 317 is aligned to at least one other video clip from video clips 317.

To compute the optimal set of pairwise matches, an undirected graph is generated with each node of the graph corresponding to one of video clips 317 and edges that define the pairwise alignment between pairs of video clips 317, as illustrated in FIG. 3. A weight for each of the edges is then equal to the cost of aligning the two video clips. A spanning tree of the undirected graph gives a set of video clips 317, with each of video clips 317 aligned to at least one other of video clips 317, and the minimum spanning tree of the undirected graph corresponds to the one with the globally minimum error. Prims algorithm may be used for the minimum spanning tree computation.

For example, and as illustrated in FIG. 3, the alignment software application may have determined the minimum spanning tree of undirected graph for video clips 317, which corresponds to the spanning tree with the globally minimum error. As such, the alignment software application may have determined that the optimal set of pairwise matches is to align video clip 317a with video clip 317b, video clip 317a with video clip 317c, video clip 317c with video clip 317d, and video clip 317c with video clip 317e. As illustrated in FIG. 3, each of video clips 317 is aligned with at least one other of video clips 317.

Figure 4:
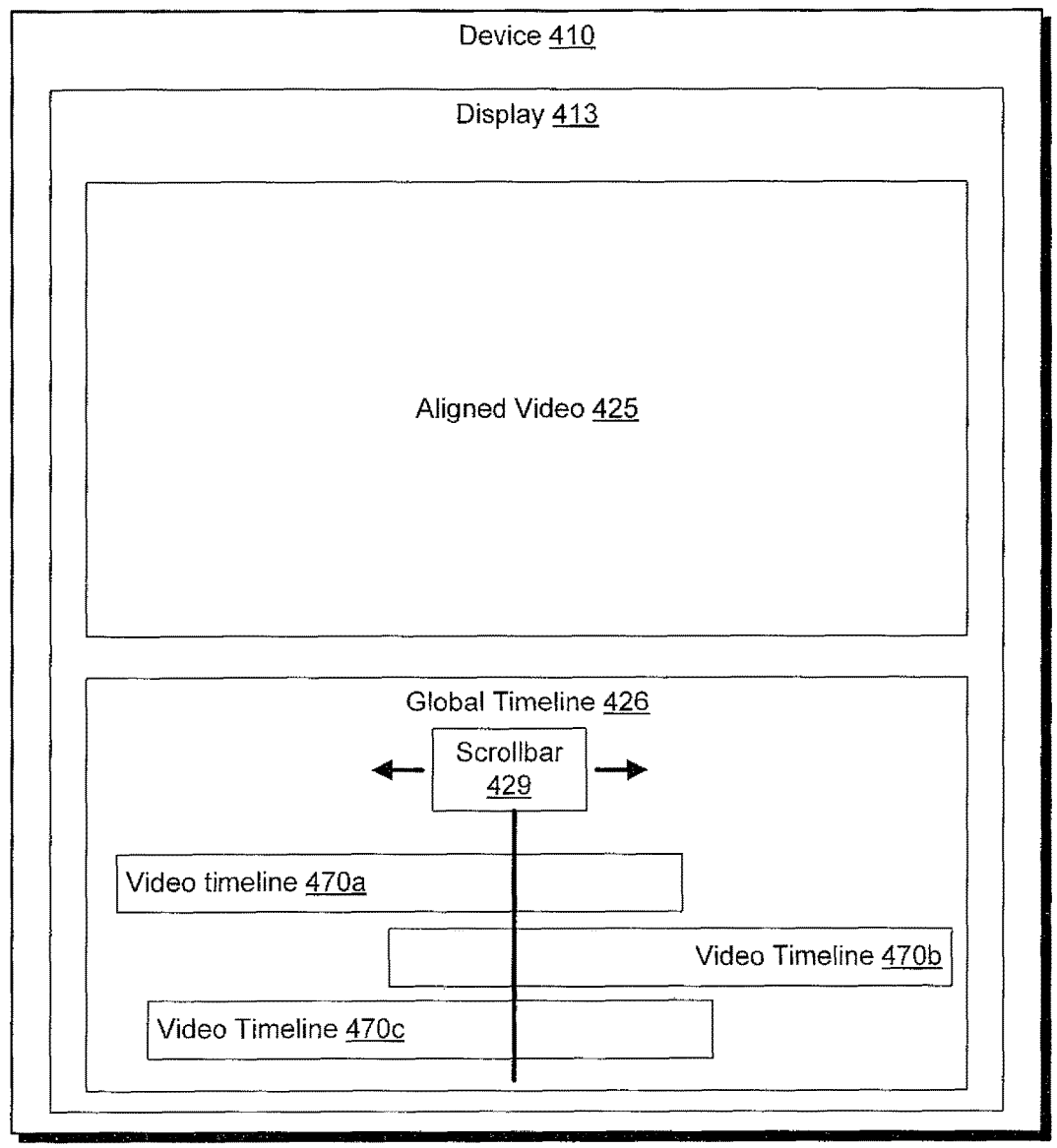
FIG. 4 presents an example of a user interface displaying an aligned video with a global timeline, according to one implementation of the present disclosure.

FIG. 4 presents an example of a user interface displaying an aligned video with a global timeline, according to one implementation of the present disclosure. FIG. 4 includes device 410, which includes display 413. Display 413 includes aligned video 425 and global timeline 426. Global timeline 426 includes scrollbar 429, video timeline 470a, video timeline 470b, and video timeline 470c, collectively referred to as video timelines 470. With respect to FIG. 4, it should be noted that device 410, display 413, aligned video 425, global timeline 426, and scrollbar 429 correspond respectively to device 110, display 113, aligned video 125, global timeline 126, and scrollbar 129 from FIG. 1. Furthermore, video timeline 470a may correspond to a timeline for video clip 117a from FIG. 1, video timeline 470b may correspond to a timeline for video clip 117b from FIG. 1, and video timeline 470c may correspond to a timeline for video clip 117c from FIG. 1.

As illustrated in FIG. 4, display 413 is displaying aligned videos 425 and global timeline 426 Aligned videos 425 may include the synchronized playback of the video clips that were aligned by an alignment software application. As such, aligned videos 425 may display each of the synchronized video clips individual, such as next to each other, or aligned videos 425 may combine the synchronized videos into a single synchronized video clip. Global timeline 426 may includes a timeline that synchronizes the playback of the video clips where a user can use scrollbar 429 to navigate through the synchronized video clips. For example, and using FIG. 1, user 140 may input video input 145 to move scrollbar 429 left and right. Moving scrollbar 429 left and right will cause aligned videos 425 to interactively display different synchronized video frames from the video clips.

Each of video timelines 470 do not line up with one another. As discussed above, alignment software application 116 may utilize partial alignment when synchronizing video clips 117. For example, the end of video clip 117a is aligned with the beginning of video clip 117b, as illustrated by video timeline 470a and video timeline 470b in FIG. 4. Furthermore, the beginning of video clip 117b is aligned with the end of video clip 117c, as illustrated by video timeline 470b and video timeline 470c from FIG. 4. As such, even though video timelines 470 do not directly align with one another, aligned video 425 will still display a complete synchronized video throughout the entire duration of global timeline 426 by using different video frames from the synchronized video clips.

Figure 5:
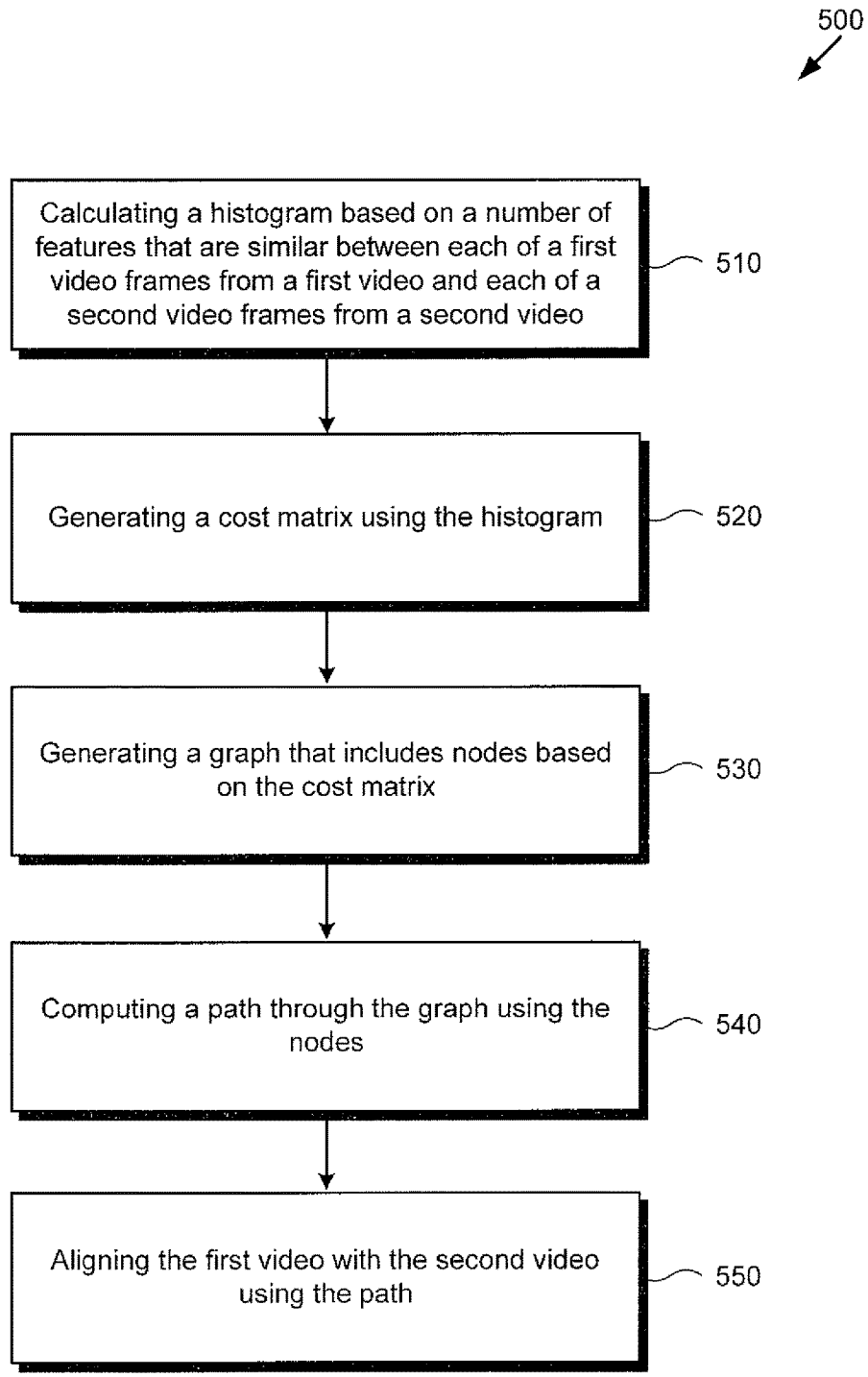
FIG. 5 shows a flowchart illustrating a method for the synchronization of multiple video clips, according to one implementation of the present disclosure.

FIG. 5 shows a flowchart illustrating a method for the synchronization of multiple video clips, according to one implementation of the present disclosure. The approach and technique indicated by flowchart 500 are sufficient to describe at least one implementation of the present disclosure, however, other implementations of the disclosure may utilize approaches and techniques different from those shown in flowchart 500. Furthermore, while flowchart 500 is described with respect to FIG. 1, the disclosed inventive concepts are not intended to be limited by specific features shown and described with respect to FIG. 1. Furthermore, with respect to the method illustrated in FIG. 5, it is noted that certain details and features have been left out of flowchart 500 in order not to obscure the discussion of inventive features in the present application.

Referring now to flowchart 500 of FIG. 5, flowchart 500 includes calculating a histogram based on a number of features that are similar between each of a first video frames from a first video and each of a second video frames from a second video (510). For example, processor 111 of device 110 may execute alignment software application 116 to calculate histogram 121 based on a number of features that are similar between each of video frames 118*a* from video clip 117*a* and each of video frames 118*b* from video clip 117*b*, where video frames 118*a* include features 119*a* and video frames 118*b* include features 119*b*. As discussed above, histogram 121 is used by alignment software application 116 to estimate the alignment quality for all pairs of video frames between video clip 117*a* and video clip 117*b*, where two video frames are more likely to be alignable if they contain a large number of similar features.

Flowchart 500 also includes generating a cost matrix using the histogram (520). For example, processor 111 of device 110 may execute alignment software application 116 to generate cost matrix 122 using histogram 121. As discussed above, cost matrix 121 is used by alignment software application 116 to approximate a cost of aligning pairs of video frames 118*a* from video 117*a* with video frames 118*b* from video 117*b*, where each entry in cost matrix 121 specifies the cost of aligning a pair of video frames.

Flowchart 500 also includes generating a graph that includes nodes based on the cost matrix (530). For example, processor 111 of device 110 may execute alignment software application 116 to generate graph 124 that includes nodes 127 based on cost matrix 122. As discussed above, graph 124 may include a graphical interpretation of cost matrix 122 that is used by alignment software application 116 to temporally map out a best solution for synchronizing video clips. As such, graph 124 includes nodes 127, where each of nodes 127 is identified by its position in cost matrix 122 and an edge is an ordered pair of nodes 127.

Flowchart 500 also includes computing a path through the graph using the nodes (540). For example, processor 111 of device 110 may execute alignment software application 116 to compute path 128 through graph 124 using nodes 127. As discussed above, alignment software application 116 uses nodes 127 of graph 124 and algorithm 120 to compute different linear and nonlinear paths through cost matrix 122, where each path temporally maps out a set of corresponding video frames in the video clips with implicit temporal continuity. Algorithm 120 computes the paths by computing a cost for the different paths through graph 124 using nodes 127, where the cost is the average of all the entries in cost matrix 122 that the path crosses. Alignment software application 116 then chooses the path with the lowest cost as path 128.

It should be noted that when determining path 128, as discussed above, and in one implementation, graph 124 may further include one or more user constraints, such as source nodes 142, constraint node 143, and path constraints 144. In such an implementation, alignment software application 116 will compute path 128 using the one or more user constraints included in graph 124.

Flowchart 500 also includes aligning the first video with the second video using the path (550). For example, processor 111 of device 110 may execute alignment software application 116 to align video clip 117*a* with video clip 117*b* using path 128. As discussed above, alignment software application 116 is able to playback the synchronized video clips as aligned video 125 on display 113. Furthermore, when aligning video clip 117*a* and video clip 117*b*, alignment software application 116 may also consider a global time frame.

Although the method of FIG. 5 only describes synchronizing two video clips, as discussed above, the present disclosure is not limited to only synchronizing two video clips. For example, processor 111 of device 110 may utilize alignment software application 116 to synchronize three or more video clips, such as video clip 117*a*, video clip 117*b*, and video clip 117*c*. When synchronizing video clips 117, alignment software application 116 will determine the cost of aligning each pair of video clips 117 and use the costs to determine the optimal set of pairwise matches such at each one of video clips 117 is aligned to at least one other of video clips 117.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions arc possible without departing from the scope of the present disclosure.

What is claimed is:

1. A system comprising:
   a display;
   a memory storing a first video and a second video, the first video including first video frames and the second video including second video frames; and
   a processor configured to:
   calculate a histogram based on similar features between each of the first video frames and each of the second video frames, wherein the features are recorded in and are part of a scene in the first video and the second video;
   generate a first cost matrix using the histogram for aligning the first video frames with the second video frames;
   generate a first graph that is a graphical interpretation of the first cost matrix, wherein the graphical interpretation of the first cost matrix includes first nodes and first edges based on the first cost matrix, and wherein each of the first nodes is identified by its position in the first cost matrix and each of the first edges is an ordered pair of the first nodes;
   receive an input from a user for adding a constraint node to the graphical interpretation of the first cost matrix;
   compute a first path through the graphical interpretation of the first cost matrix using the first nodes and the constraint node, wherein the input from the user requires the processor to compute the first path to pass through the constraint node;

align the first video with the second video using the first path; and synchronizingly play the first video and the second video on the display after aligning the first video with the second video using the first path.

2. The system of claim 1, wherein the first path matches at least one of the first video frames with at least one of the second video frames.

3. The system of claim 1, wherein the computing of the first path includes computing the first path using Dijkstra's algorithm.

4. The system of claim 1, wherein the processor is further configured to:

generate a global timeline that aligns the first video with the second video;

display the global timeline;

receive a user input, the user input corresponding to advancing a scrollbar along the global timeline;

modify a location of the constraint node on the graphical interpretation of the first cost matrix to a modified location on the graphical interpretation of the first cost matrix based on the user input; and compute a modified first path using the modified location of the constraint node on the graphical interpretation of the first cost matrix.

5. The system of claim 1, wherein the memory further includes a third video, the third video including third video frames, and wherein the processor is further configured to:

compute a second path through a second graph used for aligning the first video with the third video;

compute a third path through a third graph used for aligning the second video with the third video;

generate an undirected graph, the undirected graph including a first node for the first video, a second node for the second video, and a third node for the third video, a first edge corresponding to a first cost of aligning the first video with the second video based on the first path, a second edge corresponding to a second cost of aligning the first video with the third video based on the second path, and a third edge corresponding to a third cost of aligning the second video with the third video based on the third path; and determine optimal video pairs for aligning the first video, the second video, and the third video using the undirected graph based on the first cost, the second cost, and the third cost.

6. The system of claim 5, wherein the processor is further configured to:

align the first video, the second video, and the third video based on the optimal video pairs.

7. The system of claim 1, wherein before the computing of the first slope the processor is further configured to:

receive a user input, the user input corresponding to user constraints for the first path, the user constraints including a minimum slope and a maximum slope allowed for the first path; and compute the first path using the user constraints.

8. The system of claim 1, wherein before the computing of the first path the processor is further configured to:

add source nodes to the graphical interpretation of the first cost matrix, the source nodes corresponding to a starting position and an ending position for aligning the first video with the second video; and compute the first path using the source nodes on the graphical interpretation of the first cost matrix.

9. A method for interactively synchronizing multiple videos in a system having a processor and a display, the method comprising:

calculating, using the processor, a histogram based on similar features between each of the first video frames and each of the second video frames, wherein the features are recorded in and are part of a scene in the first video and the second video;

generating, using the processor, a first cost matrix using the histogram for aligning the first video frames with the second video frames;

generating, using the processor, a first graph that is a graphical interpretation of the first cost matrix, wherein the graphical interpretation of the first cost matrix includes first nodes and first edges based on the first cost matrix, and wherein each of the first nodes is identified by its position in the first cost matrix and each of the first edges is an ordered pair of the first nodes;

receiving an input from a user for adding a constraint node to the graphical interpretation of the first cost matrix;

computing, using the processor, a first path through the graphical interpretation of the first cost matrix using the first nodes and the constraint node, wherein the input from the user requires the processor to compute the first path to pass through the constraint node;

aligning, using the processor, the first video with the second video using the first path; and synchronizingly playing the first video and the second video on the display after the aligning of the first video with the second video using the first path.

10. The method of claim 9, wherein the first path matches at least one of the first video frames with at least one of the second video frames.

11. The method of claim 9, wherein the computing of the first path includes computing the first path using Dijkstra's algorithm.

12. The method of claim 9, wherein the method further comprises:

generating a global timeline that aligns the first video with the second video;

displaying the global timeline to a user;

receiving a user input from the user, the user input corresponding to advancing a scrollbar along the global timeline;

modifying a location of the constraint node on the graphical interpretation of the first cost matrix to a modified location on the graphical interpretation of the first cost matrix based on the user input; and computing a modified first path using the modified location of the constraint node on the graphical interpretation of the first cost matrix.

13. The method of claim 9, the method further comprising:

computing a second path through a second graph used for aligning the first video with a third video;

computing a third path through a third graph used for aligning the second video with a third video;

generating an undirected graph, the undirected graph including a first node for the first video, a second node for the second video, and a third node for the third video, a first edge corresponding to a first cost of aligning the first video with the second video based on the first path, a second edge corresponding to a second cost of aligning the first video with the third video based on the second path, and a third edge corresponding to a third cost of aligning the second video with the third video based on the third path; and determining optimal video pairs for aligning the first video, the second video, and the third video using the undirected graph based on the first cost, the second cost, and the third cost.

14. The method of claim 13, the method further comprising:
aligning the first video, the second video, and the third video based on the optimal video pairs.

15. The method of claim 9, wherein before the computing of the first slope the method further comprises:
receiving a user input, the user input corresponding to user constraints for the first path, the user constraints including a minimum slope and a maximum slope allowed for the first path; and
computing the first path using the user constraints.

16. The method of claim 9, wherein before the computing of the first path the method further comprises:
adding source nodes to the graphical interpretation of the first cost matrix, the source nodes corresponding to a starting position and an ending position for aligning the first video with the second video; and
computing the first path using the source nodes on the graphical interpretation of the first cost matrix.

17. The system of claim 1, wherein the constraint node corresponding to a match between one of the first video frames to one of the second video frames, and wherein the first graph is one of a directed and an undirected graph.

18. The method of claim 9, wherein the constraint node corresponding to a match between one of the first video frames to one of the second video frames, and wherein the first graph is one of a directed and an undirected graph.

* * * * *